United States Patent
Fuchs et al.

(10) Patent No.: US 9,619,458 B2
(45) Date of Patent: Apr. 11, 2017

(54) SYSTEM AND METHOD FOR PHRASE MATCHING WITH ARBITRARY TEXT

(71) Applicant: salesforce.com, inc., San Francisco, CA (US)

(72) Inventors: Matthew Fuchs, Los Gatos, CA (US); Zandro Luis Gonzalez, San Mateo, CA (US); Craig Howland, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 157 days.

(21) Appl. No.: 13/915,356

(22) Filed: Jun. 11, 2013

(65) Prior Publication Data

US 2014/0025369 A1 Jan. 23, 2014

Related U.S. Application Data

(60) Provisional application No. 61/674,171, filed on Jul. 20, 2012, provisional application No. 61/697,494, filed on Sep. 6, 2012.

(51) Int. Cl.
G06F 17/27 (2006.01)
G06F 17/30 (2006.01)

(52) U.S. Cl.
CPC ...... *G06F 17/2775* (2013.01); *G06F 17/2705* (2013.01); *G06F 17/2795* (2013.01); *G06F 17/3002* (2013.01); *G06F 17/30017* (2013.01); *G06F 17/3061* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

U.S. Appl. No. 13/986,251, filed Apr. 16, 2013.

*Primary Examiner* — Jialong He
*Assistant Examiner* — Yi-Sheng Wang
(74) *Attorney, Agent, or Firm* — Dergosits & Noah LLP; Todd A. Noah

(57) ABSTRACT

A system and method for matching phrases having arbitrary text. A first data structure stores a list of common phrases having multiple words. Each unique word is indexed in a hash table and mapped to one or more values that describe attributes of using the word in one or more of the common phrases. Using the hash table and the list of common phrases, a temporary array is defined to keep track of possible matches between words in an input string and the list of common phrases.

18 Claims, 8 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0101182 A1 | 5/2003 | Govrin |
| 2003/0120675 A1 | 6/2003 | Stauber et al. |
| 2003/0135495 A1* | 7/2003 | Vagnozzi .......... G06F 17/30324 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0044952 A1 | 3/2004 | Jiang |
| 2004/0128001 A1 | 7/2004 | Levin et al. |
| 2004/0148284 A1* | 7/2004 | Baker ................... G06F 17/276 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0016648 A1* | 1/2007 | Higgins ............... G06Q 10/107 |
| | | 709/206 |
| 2007/0040813 A1 | 2/2007 | Kushler |
| 2007/0136243 A1* | 6/2007 | Schorn ............. G06F 17/30613 |
| 2007/0150800 A1 | 6/2007 | Betz |
| 2007/0239689 A1* | 10/2007 | Bennett ............ G06F 17/30663 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0126122 A1* | 5/2011 | Forman ............. G06F 17/30867 |
| | | 715/745 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

\* cited by examiner

| Input String | Phrases[0] | Phrases[1] | Phrases[2] | Phrases[3] | Phrases[4] | Phrases[5] |
|---|---|---|---|---|---|---|
| | [0,0,0] | [0,0,0] | [0,0,0] | [0,0,0] | [0,0,0] | [0,0,0] |

FIG. 6A

| | | | | | | |
|---|---|---|---|---|---|---|
| the | [0,0,0] | [0,0,0] | [0,0,0] | [0,0,0] | [0,0,0] | [0,0,0] |

FIG. 6B

| | | | | | | |
|---|---|---|---|---|---|---|
| mailbox | [0,0,0] | [0,0,0] | [1,0,1] | [0,0,0] | [0,0,0] | [0,0,0] |

FIG. 6C

| | | | | | | |
|---|---|---|---|---|---|---|
| exceeds | [1,0,2] | [0,0,0] | [1,0,1] | [0,0,0] | [0,0,0] | [0,0,0] |

FIG. 6D

| | | | | | | |
|---|---|---|---|---|---|---|
| the | [1,0,2] | [0,0,0] | [1,0,1] | [0,0,0] | [0,0,0] | [0,0,0] |

FIG. 6E

| | | | | | | |
|---|---|---|---|---|---|---|
| full | [1,0,2] | [0,0,0] | [1,0,1] | [0,0,0] | [0,0,0] | [0,0,0] |

FIG. 6F

| | | | | | | |
|---|---|---|---|---|---|---|
| limit | [1,0,2] | [0,0,0] | [1,0,1] | [0,0,0] | [0,0,0] | [0,0,0] |

FIG. 6G

| | | | | | | |
|---|---|---|---|---|---|---|
| disabled | [1,0,2] | [0,0,0] | [1,0,1] | [1,1,6] | [0,0,0] | [0,0,0] |

FIG. 6H

| | | | | | | |
|---|---|---|---|---|---|---|
| temporarily | [1,0,2] | [0,0,0] | [1,0,1] | [1,1,6] | [1,2,7] | [0,0,0] |

FIG. 6I

SYSTEM AND METHOD FOR PHRASE
MATCHING WITH ARBITRARY TEXT

CLAIM OF PRIORITY

This application claims priority from U.S. Provisional Patent Application No. 61/674,171 entitled A Trie-Based Phrase Matcher with Arbitrary Text, filed Jul. 20, 2012 and U.S. Provisional Patent Application No. 61/697,494 entitled System and Method for Matching Data in an On-Demand System filed Sep. 6, 2012, both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

The subject matter disclosed herein relates generally to database records management, and more particularly, to techniques for recognizing strings of words as common expressions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access data resources from a single logical database. Typically, data is retrieved from and stored to the database using the computing systems or devices of the user. For example, a user system might remotely access one of a plurality of servers that might in turn access the database. The user may issue a query to the database in order to retrieve data. The database processes the query and returns to the user information from the database that is relevant to the query. The maintenance of the database in order to retrieve and deliver accurate information to the user in a timely and efficient manner has been and continues to be a goal of administrators of database systems.

In a multi-tenant database system ("MTS"), various elements of hardware and software of the database may be shared by one or more customers through "cloud computing" solutions which allow service providers to offer access to hardware/software systems through a network, such as the Internet. For example, an application server may be configured to simultaneously process multiple requests for many different customers, and a database may be configured to store data that is shared by many different customers.

Customers of database systems demand up-to-date, comprehensive data. For example, sales and marketing organizations need accurate and up-to-date contact information in order to maintain good relations with existing customers as well as solicit leads for new customers. Unfortunately, conventional database systems rely on individuals to maintain their own contact information, and therefore, even within a single organization, multiple individuals may have inconsistent and/or inaccurate contact information.

An advantage of the MTS system is that business enterprises may share data resources, and rely on the MTS provider to maintain the data, such as personal and/or business contact information. Another advantage is that all personnel within a single enterprise have access to the exact same contact information, so that inaccuracies or inconsistencies within the organization no longer exist.

Of course, when a customer discover a problem with stored data in an MTS system, for example, the attempted delivery of an email fails, the customer contacts the MTS to report the problem. The MTS, using automated machine techniques and/or administrator intervention, attempts to solve the problem in order to update its stored information if appropriate.

For example, error messages are usually returned by an email server when there is a problem with the specified email address, such as "invalid mailbox" or "mailbox full" as two simple examples. These messages can be useful in deciding what type of action to take to solve the problem. However, most conventional techniques for string recognition rely on examining strings of characters, one character at a time, to characterize or match the strings to known strings. Such techniques can be slow and inefficient. Accordingly, it would be desirable to provide techniques for recognizing strings of words rather than strings of characters.

BRIEF DESCRIPTION OF THE DRAWINGS

In the following drawings, like reference numbers are used to refer to like elements. Although the following figures depict various examples, the one or more implementations are not limited to the examples depicted in the figures.

FIGS. 6A-6I illustrate the sequential states of an intermediate results array during processing of an example input string using the process of FIG. 3A.

DETAILED DESCRIPTION

1. Overview

One aspect of maintaining a network interconnected system involves processing error messages or other messages from various external sources, where the messages are strings of multiple words. For example, a database application may be used for business contacts, and one or more email lists may be sold to customers for use in marketing campaigns. A customer may provide the email lists to a mass email servicer, who returns one or more "bounce" files to the customer describing email deliveries that failed. The customer then passes the bounce files back to the database application for handling and correction.

Email deliveries may fail for many reasons, and such failure is usually indicated by an error message having a format with several discrete information fields, such as <email_address><message#><descriptive_phrase>. Deciphering the descriptive phrases enables proper action to be taken by the database application to correct identified errors.

Over time, a network interconnected system such as a database application sees the same or similar messages repeatedly. Thus, a data structure can be constructed to store a list of common phrases encountered in error messages, bounce files, or other scenarios. Such a structure may be used as a reference for analyzing or comparing input strings of words. Further, each unique word in the common phrases may be indexed in a second data structure, such as a hash table, where each word is a key and is mapped to one or more values that describe attributes of using the word in one or more of the common phrases. Using the hash table and the list of common phrases, a temporary array may be used to keep track of possible matches between words in an input string and the list of common phrases.

2. Simplified System Description

As used herein, the term multi-tenant database system refers to those systems in which various elements of hardware and software of the database system may be shared by one or more customers. For example, an application server may simultaneously process requests for a large number of customers, and a database table may store rows of data for a potentially much larger number of customers. As used herein, the term query refers to a set of steps used to access information in a database system.

Figure 1:
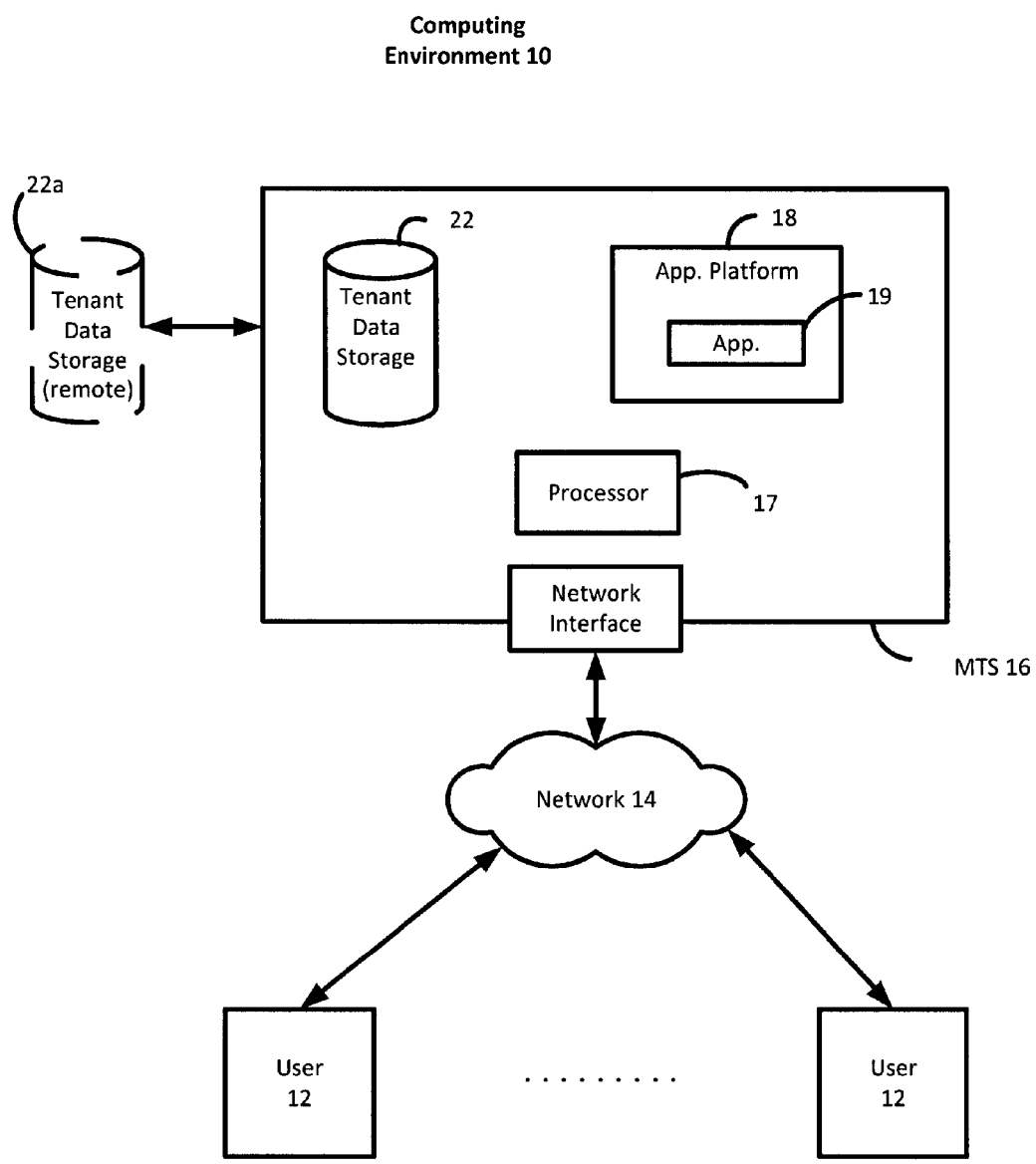
FIG. 1 is a simplified block diagram illustrating a multi-tenant database system ("MTS").
Figure 7:
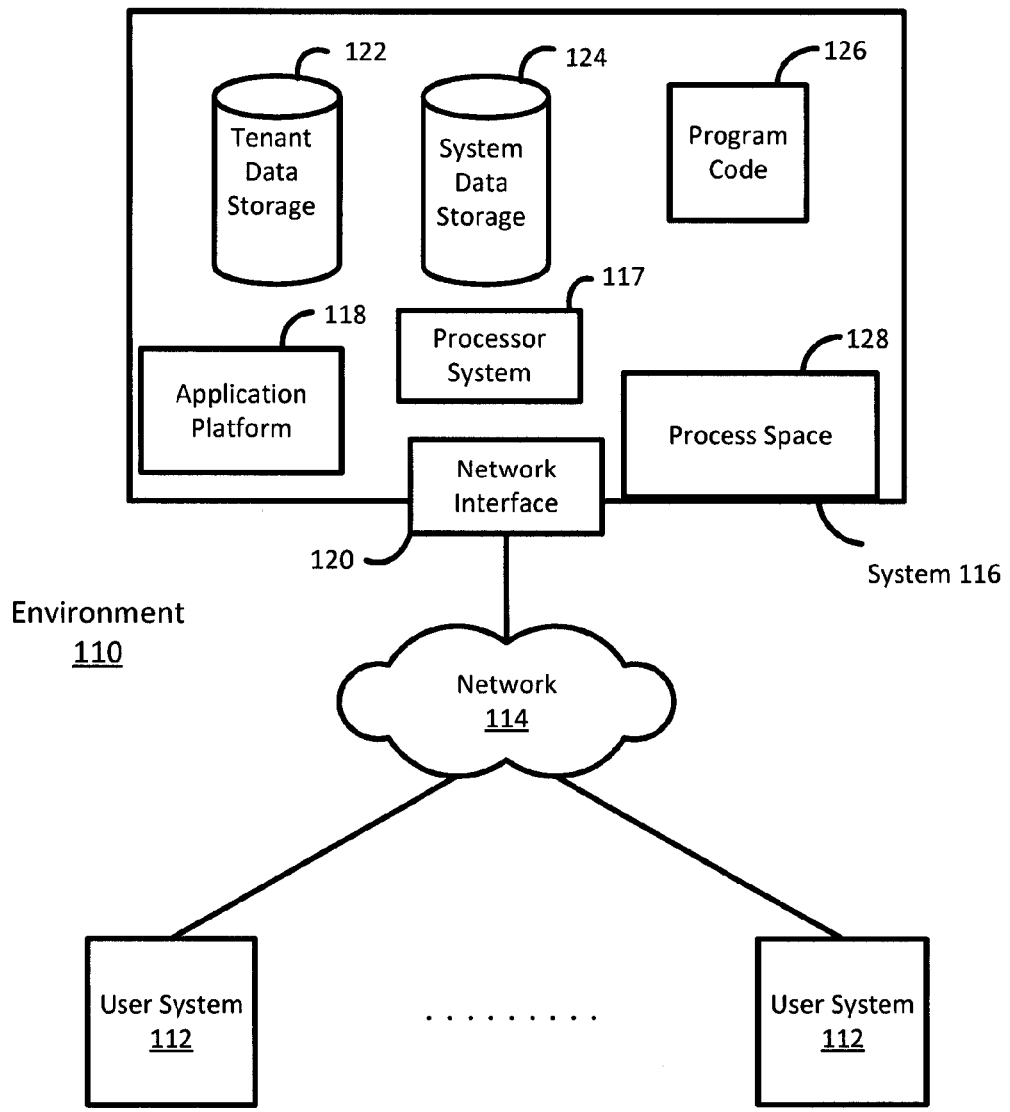
FIG. 7 illustrates a block diagram of an example of an environment wherein an on-demand database service might be used.
Figure 8:
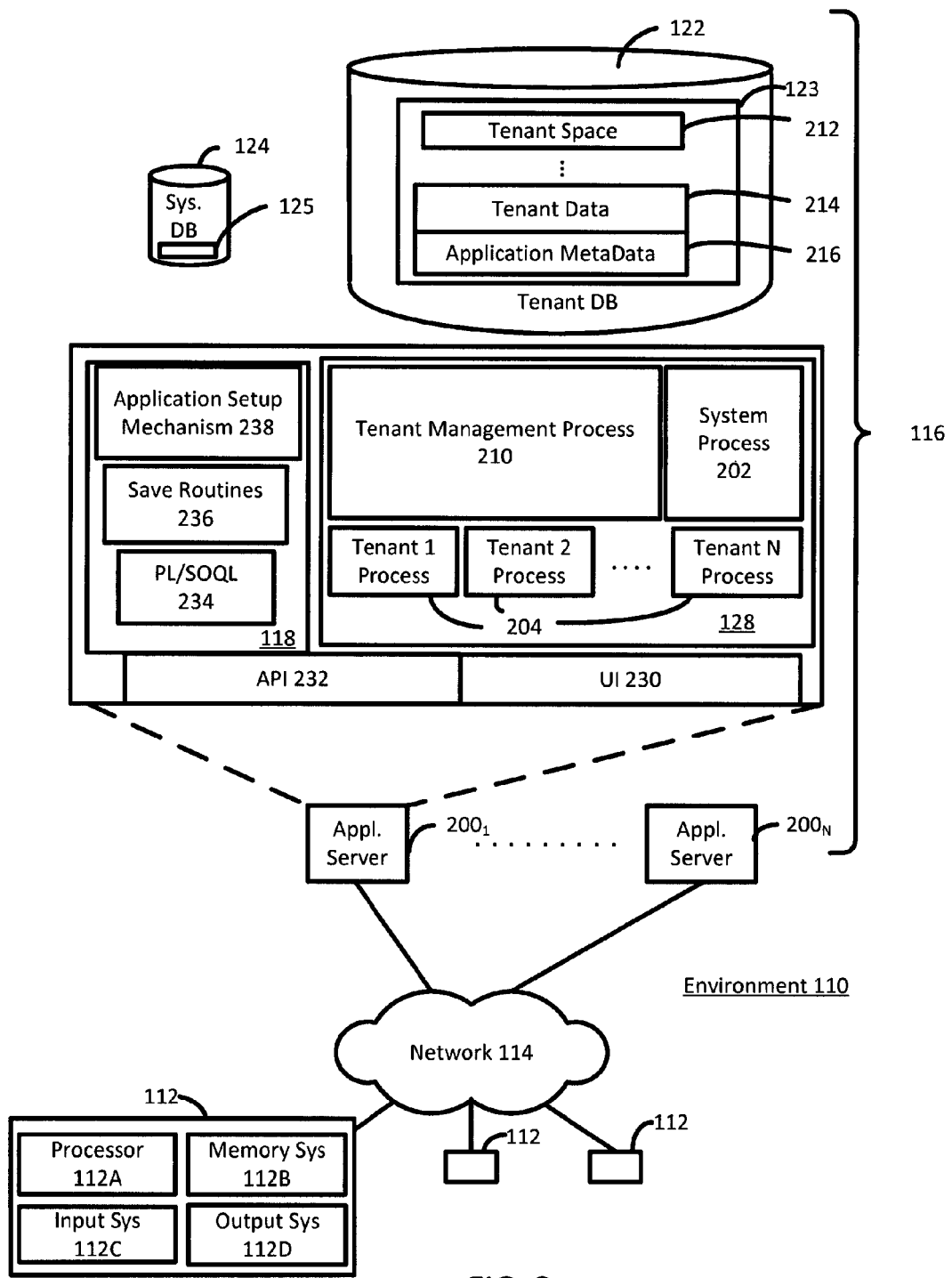
FIG. 8 illustrates a block diagram of an embodiment of elements of FIG. 8 and various possible interconnections between those elements.

FIG. 1 illustrates one embodiment of an on-demand, multi-tenant database service ("MTS") 16 operating in a computing environment 10. User devices or systems 12 access and communicate with the MTS 16 through network 14 in a known manner. More detailed examples for implementing the MTS 16 are shown in FIGS. 7-8, described below. For example, user devices 12 may be any type of processor-based computing device, such as a desktop, laptop, tablet, smartphone, etc. Network 14 may be any type of processor-based computing network, such as the Internet, local area network, wide area network, etc. The operation of the MTS 16 is controlled by a central processor system 17 running a suitable operating system.

The MTS 16 provides user systems 12 with access to many features and applications available on or through MTS 16. In particular, the MTS 16 includes tenant data storage 22, which is configured through the MTS to maintain tenant data for multiple users/tenants, as further described below. Tenant data storage 22 may be physically incorporated within MTS 16, or configured as remote storage 22a (shown in dashed lines), likewise accessible and useful to the MTS to support user systems 12. The MTS 16 is designed to facilitate storage and organized access to many different types of tenant data.

One important objective for the administrator of MTS 16 is to maintain accurate, up-to-date, and detailed information in its database. For example, for an MTS that stores contact data, a user/customer may report errors in the data via a report to the database administrator. A unique feature of MTS 16 described herein is one or more applications 19, managed and operated by the MTS through its application platform 18, that facilitate this objective by providing one or more sets of program instructions providing features to help maintain and secure the accuracy and reliability of the stored data, as well as enhance the data where possible. For example, in one embodiment described herein, instructions are provided for analyzing strings of words, rather than strings of letters, in order to recognize commonly used expressions. For example, a typical email system generates common expressions such as "invalid mailbox" or "mailbox full" when an email delivery fails. Quick recognition of these common expressions allows the system to efficiently take appropriate action, in many cases through machine-learned responses.

Figure 2:
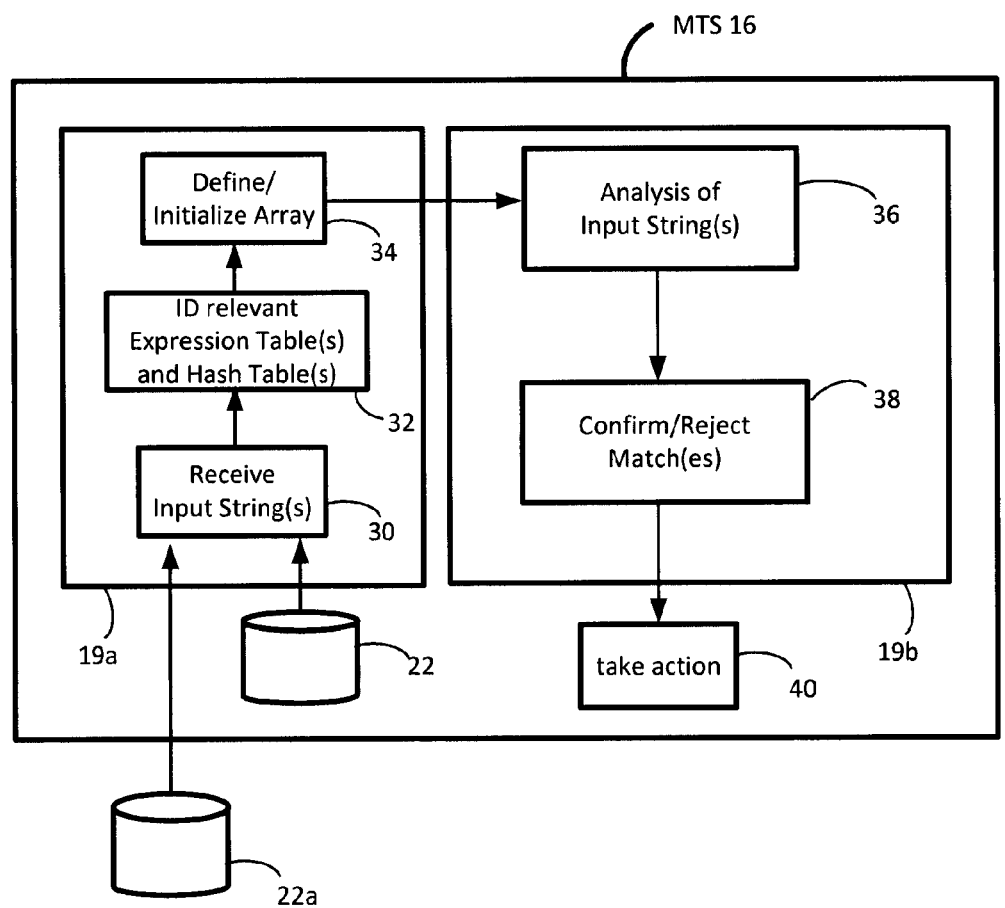
FIG. 2 is a block diagram illustrating the operational flow caused by program instructions for phrase matching on input word strings.

The block diagram shown in FIG. 2 illustrates the operation of an application 19a that performs initial handling of the input string and simple pre-processing steps, and a corresponding application 19b, which handles the main analysis and processing steps of a method for matching collections of words in the input string to one or more common expressions. Although two applications 19a and 19b are shown as part of the MTS 16, these applications may implemented as integrated or discrete parts or modules, and may also be located elsewhere, but accessible to the MTS. Also, the construction of suitable program code and interaction between different code modules can vary greatly according to need and/or desire and software platform, and thus the illustrated embodiments are not intended to limit how various software solutions may be implemented.

In application 19a, a first program module 30 has program code suitable to receive input strings from data storage 22, or from an external source 22a, for analysis. A second program module 32 includes program code to identify the relevant hash table(s) and expression table(s) to use for the analysis of the input string(s). The hash table(s) and expression table(s) are created or predefined ahead of time for use in the analysis. The expression tables list common expressions for one or more particular applications. The hash tables list the unique words from the common expressions as keys, and also summarize the attributes of the word in the expression as the value corresponding to the key. A third program module 34 defines and initializes an intermediate storage array. The array is used to keep track of possible phrase matches.

Once the pre-processing steps are completed, then analysis of an input string is performed by program code in the analysis module 36 of application 19b. The analysis module 36 evaluates one word of the input string at a time, using the hash table as a reference, and keeping track of possible matches in the intermediate storage array. In program module 38, the possible matches from the analysis step are confirmed or rejected. Finally, in program module 40, a defined action may be taken in correspondence with a matched phrase. For example, an error message with a match for the phrase "invalid mailbox" might be directed to a specific handling unit to research and correct an erroneous email address.

3. Process for Phrase Matching

In embodiments described herein, a technique is disclosed for recognizing words of an input string as keys of a hash table. One or more values are stored in correspondence with each key, and the values provide information about use of the key/word in common expressions. An intermediate storage array is used to keep track of possible matches and is indexed to correspond with a specific expression in the expression table. Advantageously, the technique targets strings of words rather than strings of letters.

Figure 3:
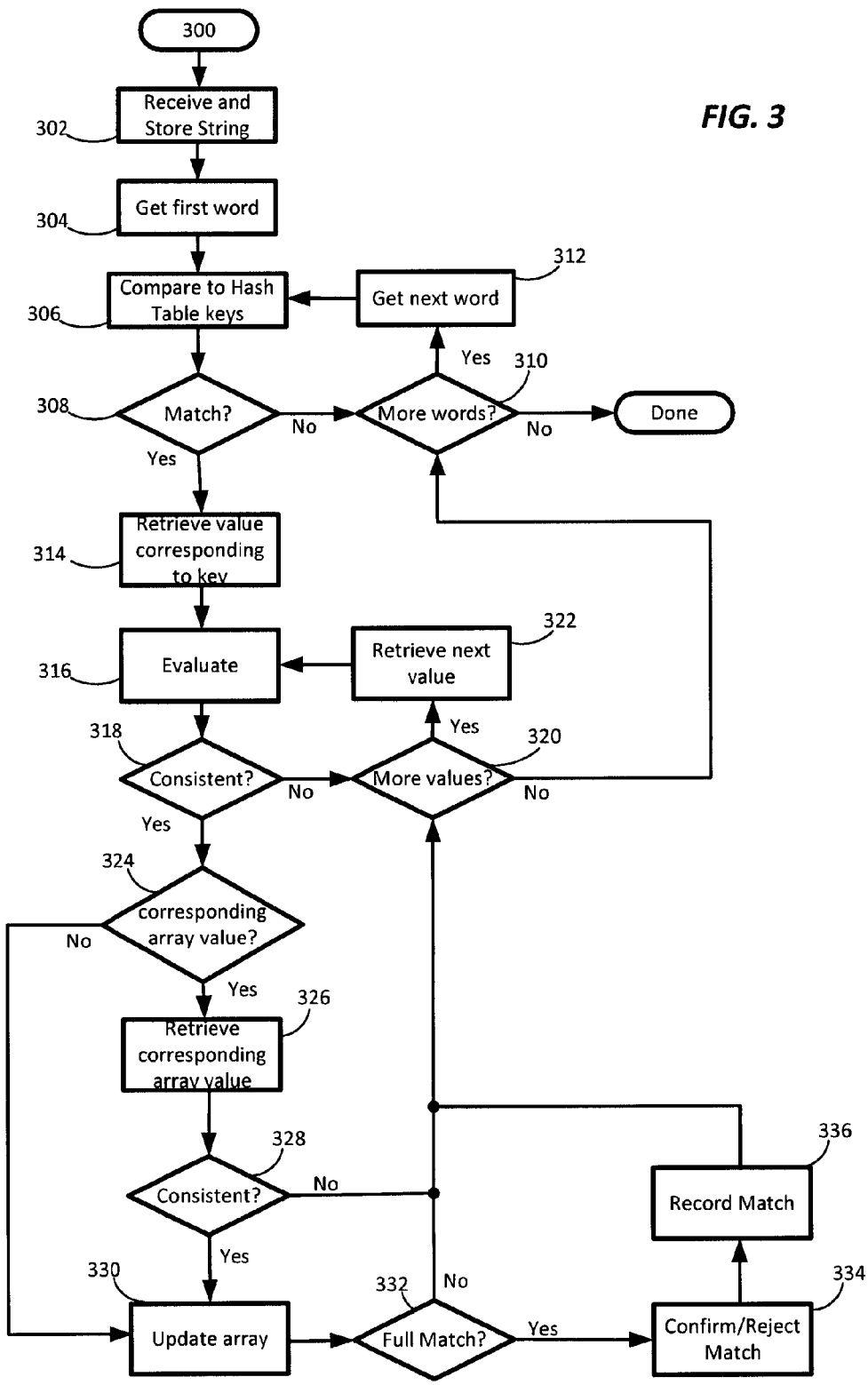
FIG. 3 is a flow chart illustrating one embodiment of a process for phrase matching on input word strings.

Referring now to FIG. 3, a process 300 is illustrated for analyzing input strings of words. In step 302, an input string having multiple words is received and placed into a temporary buffer. In step 304, the first word of the input string is retrieved from the buffer. In step 306, the word is compared to the keys in a hash table. The hash table is a defined structure storing a plurality of keys and corresponding values, and the construction of the hash table is described in more detail in Section 4 below. Each key represents a unique word from a list of common expressions. One or more values may be stored in correspondence with each key in the hash table. Each value is an actually an array of several discrete values, where each discrete value in the array describes a specific attribute of the key/word in the list of common expressions. For example, one of the attributes is the expression number in the list of common expressions in which the word appears.

If the word does not match a key in the hash table in step 308, then if the input string has more words in step 310, the next word is retrieved from the buffer in step 312 and the comparison step 306 is repeated with the next word. If there are no more words in the input string in step 310, then the process ends.

If the word matches a key in the hash table in step 308, then the corresponding value for the key is retrieved from the hash table in step 314. The retrieved value is evaluated in step 316, at least in part, to determine if the use of the word from the input string is consistent with the attributes represented by the hash table value. If the use of the word in the input string is not consistent with the attributes represented by the hash table value in step 318, then if more hash table values are present for this key in step 320, then the next hash table value is retrieved in step 322, and evaluated in step 316. If there are no more hash table values in step 320, then the process returns to step 310 to see if there are more words in the input string to analyze.

If the use of the word in the input string is consistent with the attributes represented by the hash table value in step 318, then if there is a corresponding value in the intermediate storage array in step 324, it is retrieved in step 326. The intermediate storage array is used to keep track of possible matches. If the use of the word in the input string is consistent with the value from the intermediate storage array in step 328, then the array is updated in step 330. A check is made in step 332 to see whether a match has been identified. If so, then the match confirmed or rejected in step 334, and if confirmed, is recorded in step 336. Thereafter, the process returns to step 320 to see if there are more possible matches to analyze for the current word.

If the use of the word in the input string is not consistent with the value from the intermediate storage array in step 328, then there is no match, and the process returns to step 320 to see if there are more values to consider.

If the use of the word in the input string is consistent with the attributes represented by the hash table value in step 318, but there is no corresponding value in the intermediate storage array in step 324, then the intermediate array is updated in step 330 to reflect attributes of using the word in the input phrase. A match is then considered likely in step 332, which may be confirmed or rejected in step 334.

4. Building a Hash Table

A hash table (or hash map) is a convenient and well-known data structure for mapping keys to values. In one embodiment, a hash table is defined to index words as keys for commonly encountered phrases, and one or more values are stored with each key as a list of entries that are determined from analysis of the relevant word strings, e.g., the list defines attributes relating to use of the word in the common phrase(s).

Figure 4A:
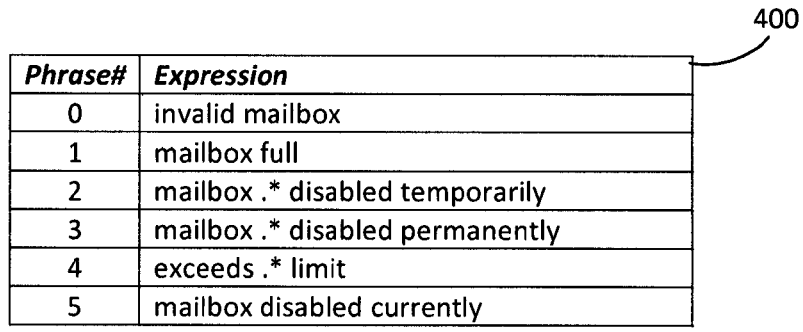
FIG. 4A illustrates a table of common expressions.

For example, consider the six phrases numbered 0 through 5 and shown in Table 400 of FIG. 4A, which include the word strings "invalid mailbox" as phrase 0 and "mailbox full" as phrase 1. (Note that the phrases are numbered starting with "0" rather than "1" consistent with computer-based references). These phrases are common expressions that may be encountered by an application, for example, as generated by an email application in response to an error detected in an email delivery operation. This is only intended as an illustrative example, as there are many common expressions or phrases that can be generated by a computer operating system, an application, a peripheral device, a network, or virtually any other computing device or person generating text, such as a newsfeed, and the techniques described herein have broad applicability to any need for phrase recognition in such applications. One or more sets of common phrases may be developed and stored in a database, for example, to use for analysis of input strings of multiple words.

Figure 4B:
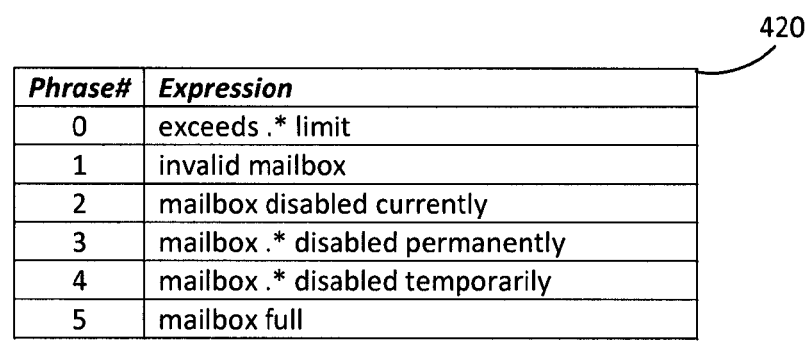
FIG. 4B illustrates the table of FIG. 4A sorted alphabetically.

The phrases listed in table 400 of FIG. 4A may be sorted alphabetically, resulting in the sorted list of word strings shown in table 420 of FIG. 4B. Further, the alpha-sorted expressions in FIG. 4B may be further simplified by removing common terms from subsequent expressions, resulting in the sorted simplified list shown in table 440 of FIG. 4C, where a common non-alphanumeric symbol, such as a dash character "- -", replaces the redundant terms in similar phrases, for example, as shown in phrases 3 through 5 in FIG. 4C.

The use of the dash character "- -" replaces redundancy in similar phrases, and indicates a branch condition. For example, rather than have a single letter correspond to a single node as in a simple tree, at least an entire word or phrase may correspond to a single node.

Figure 4C:
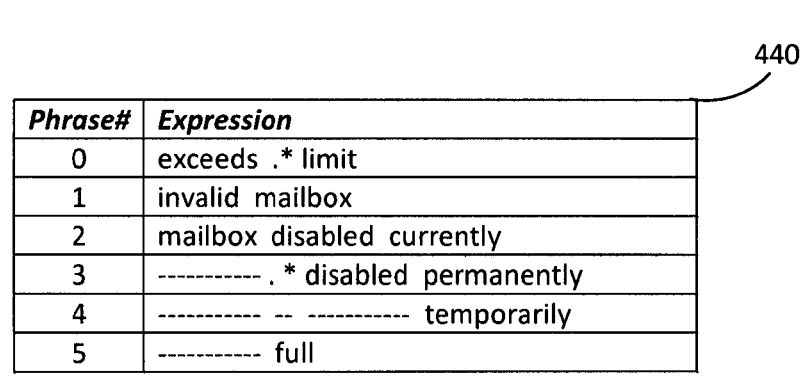
FIG. 4C illustrates the sorted table of FIG. 4B with redundant words eliminated.
Figure 5:
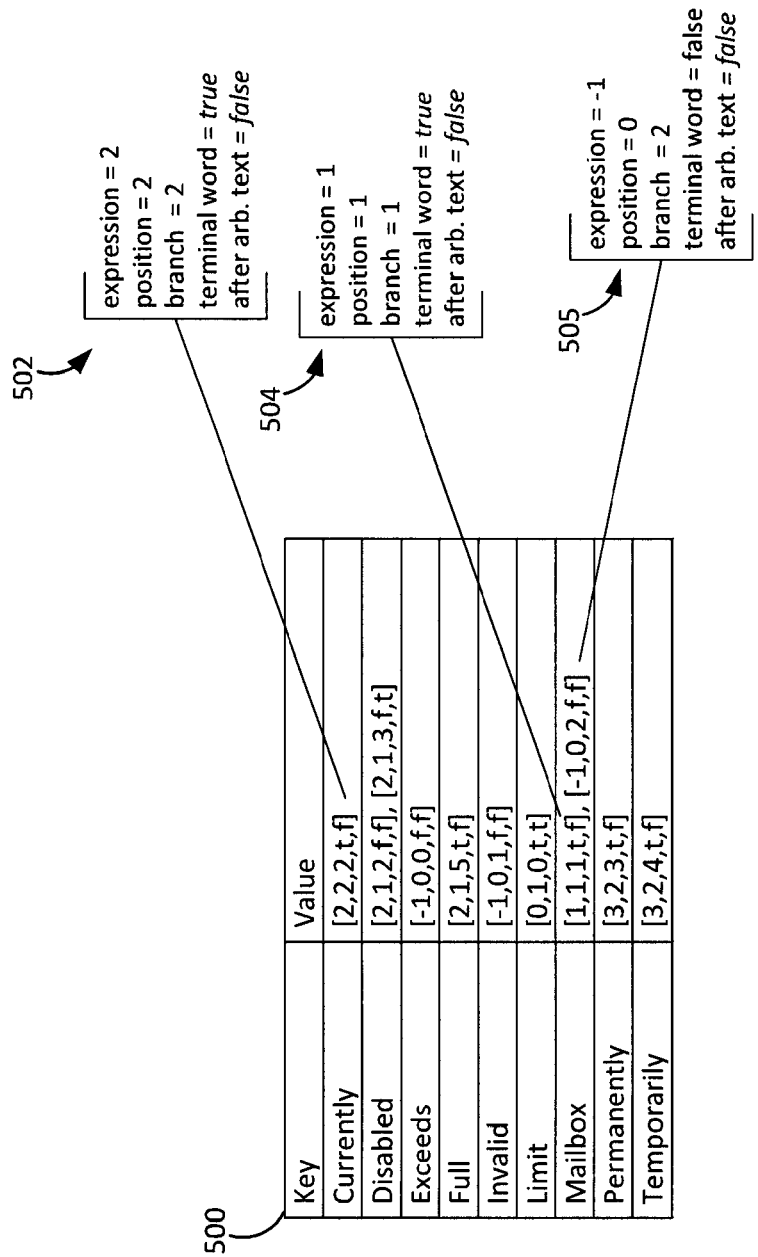
FIG. 5 illustrates a hash table with each unique word from the table of FIG. 4C stored as a key, and each key mapped to one or more corresponding values describing attributes of the key/word and the corresponding common expression.

From the sorted simplified list shown in FIG. 4C, a hash table can be built as shown in table 500 in FIG. 5, with each word from the expressions shown in FIG. 4C being indexed as a key in the hash table. The corresponding value for each key is shown as a list of bracketed values, for example, [a, b, c, d, e], the values representing attributes of the words of the common expressions. In one example, the list entries [a, b, c, d, e] are specified as [a] the phrase number containing the word; except, if the word is the first word in the expression, then the phrase number will be set equal to "−1" as a special designator; [b] the position of the word in the expression; [c] the branch expression number, i.e., a subsequent expression having the same root; [d] whether the word is the terminal word in the expression; and [e] whether the word follows arbitrary text (represented by the characters ".*").

Thus, the first row of the hash table stores the key "currently," and the corresponding value "[2,2,2,t,f]." FIG. 5 includes a "callout box" 502 which describes each attribute of the hash table value. Thus, the first value "2" indicates that "currently" appears in the third expression in FIG. 4C; the second value "2" indicates that "currently" is the third word in that expression; the third value "2" indicates that "currently" first appears in the third branch, i.e., the third expression; the fourth value "t" indicates that "currently" is the terminal word in the phrase; and the fifth value "f" indicates that "currently" does not follow arbitrary text. FIG. 5 also includes callout boxes 504 and 505 that similarly describe each attribute of both hash table values for the key "mailbox."

One or more hash tables can thus be constructed to index lists of common expressions, for example, to facilitate processing for a computing application, such as database management.

5. Analyzing Strings of Words

In order to analyze an input string of words using the hash table(s), an array is defined to store intermediate values. For example, the array phrases[ ] may be defined for use with the expression table 440 of FIG. 4C and the hash table 500 of FIG. 5. Since there are six expressions in the expression table 440, the array will be defined to have a length of six, and each position in the array will be indexed to an expression in the expressions table. Further, each position of the array will have a value [x,y,z], where x=the sentence number for the input string (where each new sentence has a subsequent value, starting with 1), y=the position of the word in the common phrase, and z=the position of the word in the input string. For the sake of brevity and ease of handling, the array may be initialized with objects [0,0,0] in all positions.

6. Example Analysis

Consider as an example the following input string received as an error message:

"the mailbox exceeds the full limit disabled temporarily."

This string may be analyzed one word at a time against the keys stored in the hash table of FIG. 5 using process 300, and the progress of such analysis is illustrated with reference to FIGS. 6A-6I. As noted above, the intermediate array phrases[ ] may be initialized with object values [0,0,0] in all positions, as shown in FIG. 6A.

The first word in the input sentence is "the," and since this word does not appear as a key in the hash table, it is ignored and the next word in the sentence is evaluated. All values in the array phrases[ ] remain unchanged as shown in FIG. 6B.

The second word in the input sentence is "mailbox" and is located as a key in the hash table with two value entries, indicating that the word appears in multiple phrases in the expressions table of FIG. 4C. Each value entry is considered in turn.

The first value for the key "mailbox" in the hash table is [1,1,1,t,f]. This value indicates that for the second phrase in FIG. 4C, the word "mailbox" is in the second position, which is consistent with the input string. The corresponding array value for the second phrase, e.g., phrases[1], is examined. That value is [0,0,0] as indicated in FIG. 6B, and is not helpful.

The second value entry for "mailbox" in the hash table is [−1,0,2,f,f]. This value indicates that "mailbox" is in the first position in the third phrase, which could be correct, and therefore the value [1,0,1] is stored to phrases[2] as shown in FIG. 6C. That is, the array keeps track of a possible match with the third phrase where "mailbox" is the first word in the phrase, depending on what follows.

The third word in the input sentence is "exceeds." The word is located in the hash table with a value of [−1,0,0,f,f]. The hash table value indicates that the word "exceeds" is in the first position for the first phrase in the expressions table of FIG. 4C. This may be also true for the input string, depending on what follows. The value phrases[0] is examined, but it still has the initialized value [0,0,0] at this point, and therefore it is updated to [1,0,2] as shown in FIG. 6D; that is, the intermediate array is updated at phrases[0] to keep track of the possible use of "exceeds" in the first input string as the first word of an expression, as well as the fact that the word is in the third position of the input string.

The fourth word in the input sentence is "the" again, which is not in the hash table, so it is ignored and the next word evaluated, with the phrases[] array remaining unchanged as shown in FIG. 6E.

The fifth word in the input sentence is "full," which is found in the hash table with a value of [2,1,5,t,f]. The hash table value indicates that the word "full" is in the second position of the sixth expression of FIG. 4C (i.e., branch=5). The value for phrases[2] is examined, which reveals the value [1,0,1] stored there after analysis of the second entry of "mailbox" above. The last value "1" in the entry shows that the previous word matched in the phrase was the second in the sentence, while the word "full" is the fifth word in the sentence. However, the sixth expression in FIG. 4C does not allow for arbitrary text between the words, so "full" would only result in a match if it were the next word after "mailbox," and it is not, so the analysis moves on and the array phrases[] remains unchanged as shown in FIG. 6F.

The sixth word in the input sentence is "limit," which is found in the hash table with the value [0,1,0,t,t]. The hash table value indicates that the word "limit" is in the second position of the first expression in FIG. 4C. Therefore, phrases[0] is examined, which has the value [1,0,2]. The value of phrases[0] indicates that "limit" is the third word in the sentence, which is consistent with the first expressions in FIG. 4C, and the hash table value also tells us that the word follows arbitrary text and is the terminal word in the phrase. These indicators are all consistent with a match for the first expression, i.e., phrase[0]="exceeds .* limit" and no changes are made to the array phrases[], as shown in FIG. 6G, but the phrase is recorded as having been matched.

The seventh word in the input sentence is "disabled," which is found in the hash table with two different values. The first hash table value is [2,1,2,f,f]. This first hash table value indicates that the word "disabled" is in the second position of the third expression in FIG. 4C. The value for phrases[2] is [1,0,1], which also indicates the word is in the second position in the input string. However, the hash table value also indicates that the word does not follow arbitrary text, and since the word "limit" precedes "disabled" in the input string, there is no match.

The second hash table value for "disabled" is [2,1,3,f,t], which still indicates the second position of the third expression, but at the fourth branch, i.e., the fourth expression in FIG. 4C. The value for phrases[2] is still [1,0,1]. However, the hash table entry also indicates that the word does follow arbitrary text, and therefore results in a match for the fourth branch expression, namely "- - - - - - - - - . * disabled temporarily." Therefore, the value [1,1,6] is stored at phrases[3]; that is, the intermediate array is updated at phrases[3] to keep track of the use of "disabled" in the first input string as the second word of an expression.

The eighth and final word in the message is "temporarily," which is found in the hash table with the value [3,2,4,t,f]. The hash table value indicates that the word is the third word in the fourth expression, at the fifth branch. The value for the corresponding array phrases[3] is [1,1,6], indicating that the word is in the second position. This is true, so a match exists, thus the value [1,2,7] in entered into phrases[4] as shown in FIG. 6I; that is, the intermediate array is updated at phrases[4] to keep track of the use of "temporarily" in the first input string as the third word of an expression, namely "- - - - - - - - . * disabled temporarily."

Thus, the analysis has revealed that words of the input string create a match with both the first phrase in FIG. 4C and the fifth phrase of FIG. 4C.

7. Detailed System Description

FIG. 7 is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 7 (and in more detail in FIG. 8), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 7, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 7 include conventional, well-known elements that are explained only briefly here. For example, each user system 112 could include a desktop personal computer, workstation, laptop, PDA, cell phone, or any wireless access protocol (WAP)

enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 8 also illustrates environment 110. However, in FIG. 8 elements of system 116 and various interconnections in an embodiment are further illustrated. FIG. 8 shows that user system 112 may include processor system 1110, memory system 1111, input system 112C, and output system 112D. FIG. 8 shows network 114 and system 116. FIG. 8 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 7. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 8, system 116 may include a network interface 115 (of FIG. 7) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for phrase matching in database operations, comprising:
   storing, by a database system, a plurality of expressions in a first data structure, each expression having a plurality of words;
   storing, by the database system, for each word of the plurality of expressions a corresponding key with at least one associated value into a second data structure, each associated value representing a first plurality of attributes relating to use of the corresponding word in one of the expressions in the first data structure, the first plurality of attributes including at least two of: (i) an identification of the expression in the first data structure; (ii) a position of the word in the expression; (iii) a branch expression number; (iv) whether the word is a terminal word in the expression; and (v) whether the word follows arbitrary text;
   receiving, by the database system, an input sentence having a string of words;
   comparing, by the database system, a word from the input sentence with each key of the second data structure;
   evaluating, in the input sentence, for each word that matches a key, the first plurality of attributes associated with the matched key and storing a second plurality of attributes in a third data structure, the second plurality of attributes indicating how use of the matching word in the input sentence compares with use of the word in one of the expressions in the first data structure, the second plurality of attributes including at least one of: (i) a number of the input sentence; (ii) a position of the word in the corresponding expression; and (iii) a position of the word in the input sentence;
   repeating, by the database system, the comparing step for each word from the input sentence; and determining, by the database system, based on the first plurality of attributes and the second plurality of attributes if one or more expressions from the first data structure are present in the input sentence.

2. The method of claim 1, further comprising:
   updating, by the database system, the second plurality of attributes when use of the word from the input sentence is consistent with use of the word in an expression of the first data structure.

3. The method of claim 1, the third data structure comprising an array having a length equal to a total of the plurality of expressions in the first data structure, and an index corresponding to the total of the plurality of expressions in the first data structure, the method further comprising:
   retrieving, by the database system, the second plurality of attributes from the array at the index corresponding to the matched key.

4. The method of claim 1, the third data structure comprising an array having a length equal to a total of the plurality of expressions in the first data structure, and an index corresponding to the total of the plurality of expressions in the first data structure, the method further comprising:
   updating, by the database system, the second plurality of attributes in the array at the index corresponding to the matched key.

5. The method of claim 1, the third data structure comprising an array having a length equal to a total of the plurality of expressions in the first data structure, and an index corresponding to the total of the plurality of expressions in the first data structure, the method further comprising:
   retrieving, by the database system, the second plurality of attributes from the array at the index corresponding to the position of the word in the input sentence; and
   evaluating, by the database system, the retrieved second plurality of attributes for consistency with the first plurality of attributes.

6. The method of claim 1, wherein at least one expression in the first data structure includes arbitrary text between words of the expression.

7. The method of claim 1, the determining step further comprising:
   evaluating, by the database system, the second plurality of attributes for consistency with the first plurality of attributes for a word from the input sentence matching a key from the second data structure;
   repeating, by the database system, the step of evaluating the second plurality of attributes for each word from the input sentence that matches a key from the second data structure; and
   designating, by the database system, one or collections of words from the input sentence as matching expressions stored in the first data structure.

8. The method of claim 7, further comprising:
   initializing, by the database system, the second plurality of attributes; and
   updating, by the database system, the second plurality of attributes when the step of evaluating the second plurality of attributes is consistent with the first plurality of attributes.

9. A non-transitory computer-readable storage medium encoded with executable instructions for phrase matching in database operations, the instructions comprising:
   storing a plurality of expressions in a first data structure, each expression having a plurality of words;
   storing, by the database system, for each word of the plurality of expressions a corresponding key with at least one associated value into a second data structure, each associated value representing a first plurality of attributes relating to use of the corresponding word in one of the expressions in the first data structure, the first plurality of attributes including at least two of: (i) an identification of the expression in the first data structure; (ii) a position of the word in the expression; (iii) a branch expression number; (iv) whether the word is a terminal word in the expression; and (v) whether the word follows arbitrary text;

receiving an input sentence having a string of words;

comparing a word from the input sentence with each key of the second data structure; evaluating, in the input sentence, for each word that matches a key, the first plurality of attributes associated with the matched key and storing a second plurality of attributes in a third data structure, the second plurality of attributes indicating how use of the matching word in the input sentence compares with use of the word in one of the expressions in the first data structure, the second plurality of attributes including at least one of: (i) a number of the input sentence; (ii) a position of the word in the corresponding expression; and (iii) a position of the word in the input sentence;

repeating the comparing step for each word from the input sentence; and determining based on the first plurality of attributes and the second plurality of attributes if one or more expressions from the first data structure are present in the input sentence.

10. The computer-readable storage medium of claim 9, the instructions further comprising:

updating the second plurality of attributes when use of the word from the input sentence is consistent with use of the word in an expression of the first data structure.

11. The computer-readable storage medium of claim 9, the third data structure comprising an array having a length equal to a total of the plurality of expressions in the first data structure, and an index corresponding to the total of the plurality of expressions in the first data structure, the method further comprising:

updating the second plurality of attributes in the array at the index corresponding to the matched key.

12. The computer-readable storage medium of claim 9, the third data structure comprising an array having a length equal to a total of the plurality of expressions in the first data structure, and an index corresponding to the total of the plurality of expressions in the first data structure, the method further comprising:

retrieving the second plurality of attributes from the array at the index corresponding to the position of the word in the input sentence; and evaluating the retrieved second plurality of attributes for consistency with the first plurality of attributes.

13. The computer-readable storage medium of claim 9, the determining step further comprising:

evaluating the second plurality of attributes for consistency with the first plurality of attributes for a word from the input sentence matching a key from the second data structure;

repeating the step of evaluating the second plurality of attributes for each word from the input sentence that matches a key from the second data structure; and designating one or collections of words from the input sentence as matching expressions stored in the first data structure.

14. The computer-readable storage medium of claim 9, wherein at least one expression in the first data structure includes arbitrary text between words of the expression.

15. A system for phrase matching in database operations, comprising:

a processor; and one or more stored sequences of instructions which, when executed by the processor, cause the processor to:

store a plurality of expressions in a first data structure, each expression having a plurality of words;

store, by the database system, for each word of the plurality of expressions a corresponding key with at least one associated value into a second data structure, each associated value representing a first plurality of attributes relating to use of the corresponding word in one of the expressions in the first data structure, the first plurality of attributes including at least two of: (i) an identification of the expression in the first data structure; (ii) a position of the word in the expression; (iii) a branch expression number; (iv) whether the word is a terminal word in the expression; and (v) whether the word follows arbitrary text;

receive an input sentence having a string of words;

compare a word from the input sentence with each key of the second data structure;

evaluate, in the input sentence, for each word that matches a key, the first plurality of attributes associated with the matched key and storing a second plurality of attributes in a third data structure, the second plurality of attributes indicating how use of the matching word in the input sentence compares with use of the word in one of the expressions in the first data structure, the second plurality of attributes including at least one of: (i) number of the input sentence; (ii) a position of the word in the corresponding expression; and (iii) a position of the word in the input sentence;

repeat the comparing step for each word from the input sentence; and determine based on the first plurality of attributes and the second plurality of attributes if one or more expressions from the first data structure are present in the input sentence.

16. The system of claim 15, the third data structure comprising an array having a length equal to a total of the plurality of expressions in the first data structure, and an index corresponding to the number of the expression in the first data structure, the instructions, which when executed by the processor, further cause the processor to:

retrieve the second plurality of attributes from the array at the index corresponding to the matched key.

17. The system of claim 15, the third data structure comprising an array having a length equal to a total of the plurality of expressions in the first data structure, and an index corresponding to the total of the plurality of expressions in the first data structure, the instructions, which when executed by the processor, further cause the processor to:

retrieve the second plurality of attributes from the array at the index corresponding to the position of the word in the input sentence; and evaluate the retrieved second plurality of attributes for consistency with the first plurality of attributes.

18. The system of claim 15, the instructions, which when executed by the processor, further cause the processor to:

evaluate the second plurality of attributes for consistency with the first plurality of attributes for a word from the input sentence matching a key from the second data structure;

repeat evaluating the second plurality of attributes for each word from the input sentence that matches a key from the second data structure; and designate one or collections of words from the input sentence as matching expressions stored in the first data structure.

* * * * *